June 11, 1957     J. E. VISTAIN, JR     2,795,429
AUTOMATIC RECORD PLAYER
Filed May 11, 1950     9 Sheets-Sheet 1

INVENTOR.
James E. Vistain Jr.
BY
his Atty.

June 11, 1957    J. E. VISTAIN, JR    2,795,429
AUTOMATIC RECORD PLAYER
Filed May 11, 1950    9 Sheets-Sheet 5

INVENTOR.
James E. Vistain Jr.

June 11, 1957  J. E. VISTAIN, JR  2,795,429
AUTOMATIC RECORD PLAYER
Filed May 11, 1950  9 Sheets-Sheet 7

INVENTOR.
James E. Vistain Jr.
BY
J. O. Douglas
His Atty.

INVENTOR.
James E. Vistain Jr.

June 11, 1957  J. E. VISTAIN, JR  2,795,429
AUTOMATIC RECORD PLAYER
Filed May 11, 1950  9 Sheets-Sheet 9

INVENTOR.
JAMES E. VISTAIN JR.
BY

United States Patent Office 2,795,429
Patented June 11, 1957

2,795,429

AUTOMATIC RECORD PLAYER

James E. Vistain, Jr., Chicago, Ill., assignor to Admiral Corporation, Chicago, Ill., a corporation of Delaware Application May 11, 1950, Serial No. 161,370

5 Claims. (Cl. 274—10)

This invention relates to new and useful improvements in phonograph record player mechanism, and more particularly to a record changer of the type wherein the records are disposed in a stack above the turntable and discharged one at a time and in succession on to the turntable.

A principal advantage made possible by the present invention, as incorporated in my improved record player, is simplicity of construction which, besides affording ease of assembly and consequent reduction in the cost of manufacture, also affords convenience in case of repair. This advantage is gained in view of the increased capacity of the mechanism to reproduce a stack of records of common characteristics. The mechanism is adjustable for playing other stacks of records differing in such characteristics as the speed at which the record must be played, the structure of their terminal or trip grooves, their overall diameters and the size of their center holes. An additional advantage is the manner in which three of the controls are grouped, to be readily accessible at one point on the base plate; one of the controls being for regulating the turntable speed, another for manually rejecting a record, and a third for remotely determining the position at which the pickup arm is adapted to be lowered into initial engagement with a record on the turntable.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention, and, together with the description, serve to explain the principles of the invention.

In connection with my improved record player, the reference character 2 is used to denote a chassis or base plate. It is formed preferably of sheet metal which has been drawn to provide a horizontal, rectangular surface from the edges of which a flange 3 extends downward, partly to add rigidity to the plate. Additional rigidity is provided by a cylindrical depression 4 (Fig. 9), centrally of the base plate, in which a depending flange 6 of a conventional turntable 7 is accommodated. The turntable 7 is supported from a lower wall 8, defining the lower extremity of depression 4. The support connection between the turntable and wall 8 comprises a hub 9, on the turntable 7, and a bearing 11 which is rigidly coupled, at its upper end, to the wall 8 at the edge of an aperture 12 therein. Centrally thereof, the bearing 11 is provided with a bore 13 in which is rigidly mounted a tubular shaft 14 which provides a stationary support about which the turntable hub 9 is adapted to turn. The hub is spaced from bearing 11 by a conventional thrust type of ball bearing 16 pocketed within a counterbore 17 in the bearing 11. If desired, the upper end of tubular shaft 14 may be annularly grooved at 18 to provide a seat for a suitable fastener such as a C-washer or wire 19 by means of which the turntable is releasably anchored against displacement away from the bearing 11.

Figures 1, 2, 3:
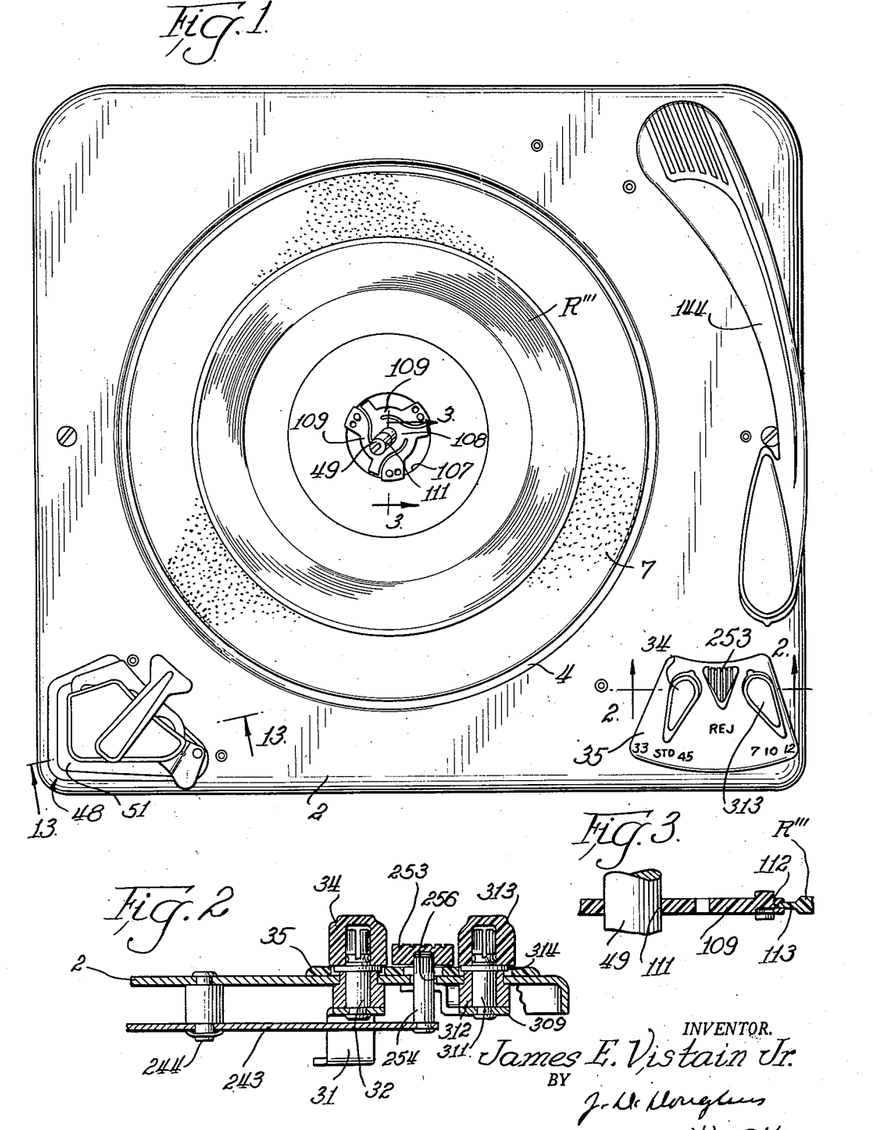
Fig. 1 is a top plan view of a record player in which the novel features are incorporated.
Fig. 2 is a vertical sectional view taken on line 2—2 of Fig. 1.
Fig. 3 is a vertical sectional view from line 3—3 of Fig. 1.
Figure 4:
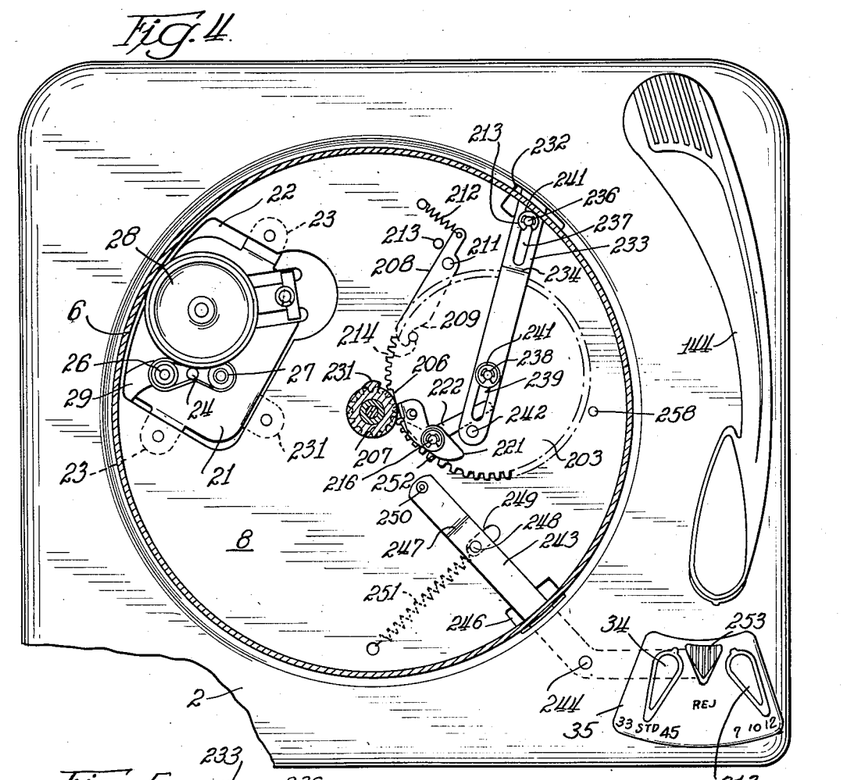
Fig. 4 is a view similar to Fig. 1, the top of the turntable being broken away to reveal the structure of underlying parts.
Figure 8:
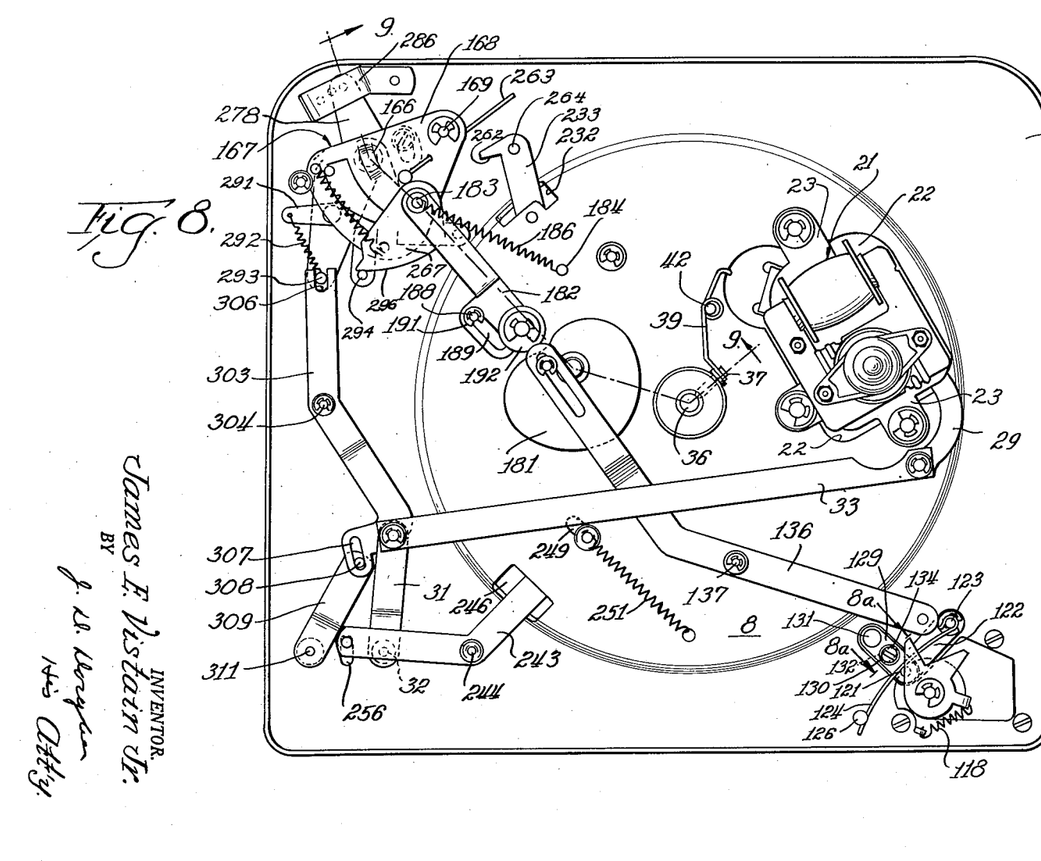
Fig. 8 is a bottom plan view of the record player.

The turntable is adapted to be operated at a plurality of speeds by a motive unit 21 (Fig. 4). It is supported beneath an aperture 22 in the wall 8 by means including lateral arms 23, on the motive unit, suitably coupled to said wall. The motive unit 21 further includes a driven motor shaft 24 which is belt-coupled to a pair of mobile idlers 26 and 27, differing in diameter from each other, and also differing in diameter from the shaft 24. The pressure of a spring not shown, is employed to urge a rubber tired floating idler 28 into driving engagement with the turntable flange 6, and concurrently with either the shaft 24 or one of the idlers 26 or 27. The means of support for the idlers does not form a part of the present invention, and hence will not be described. The means by which the idlers 26 and 27 are adapted to be operatively moved for driving engagement with idler 28, however, includes a first and movable control arm 29, on the motive unit 21, which is coupled to a second control arm 31 (Fig. 8) pivoted to the base plate at 32, by a link 33. The pivotal connection 32 includes a handle 34 (Fig. 2) which is rigidly coupled, in any suitable manner, to the arm 31 so that by turning said handle the speed can be selected at which it is desired that the turntable should be operated. Desirably, the base plate, beside handle 34, is surmounted by a dial 35 which is appropriately marked by the characters "33" for the 33⅓ R. P. M. microgroove records, "45" for the 45 R. P. M. microgroove records, and "Std" for the older, coarse grooved records adapted to be reproduced at a speed of 78.26 R. P. M. A spindle 36 (Fig. 9) is releasably supported by the sleeve 14. The spindle is anchored aginst axial displacement by a pin 37 passing through the side of bearing 11, shaft 14 and into engagement with an annular groove 38 about the lower end of the spindle. The pin 37 is biased into engagement with groove 38 by a deflection spring 39 bearing aginst a flange 41, on pin 37, while anchored to the base plate by means including a stud 42 on wall 8 (Fig. 8). The spindle 36 is also adapted to be secured against displacement angularly of its axis by a second pin 43, on the spindle, which is adapted to be received in notches 44 at the upper end of tubular shaft 14. It will thus be apparent that the spindle is adapted to be removed from its supports by forcibly moving it upward in which operation the groove 38 cams pin 37 outward against the force of spring 39. For positioning the spindle in the sleeve 14, said spindle is provided with a short tapered or beveled portion at 46 by which pin 37 is cammed outward until the position of groove 38 enables said pin to be snapped into engagement therewith.

As magazine means for a stack of records, the spindle 36 is provided with a shoulder 47 (Fig. 11) on which the bottom record of the stack is adapted to rest while also supported, at its periphery by an ejector head, indicated in its entirety by the character 48. While the records are thus supported, their center holes are threaded over an offset portion 49 in a manner well known in the art.

The ejector head 48 (Fig. 1) includes a casing or shell 51 (Fig. 13), preferably of Bakelite or other suitable plastic material, which is bolted to the base plate 2. The casing supports, in vertical position, a carrier sleeve 52 which is journalled in a bore 53 extending throughout the length of a boss 54 which is an integral part of the shell 51. The sleeve is further supported against lateral play by a bearing plate 50, the edges of which closely align themselves with the internal walls of the shell 51. Additional support for sleeve 52 includes a thrust washer 56 on the sleeve 52 between boss 54 and a support plate 57, said plate resting on the washer and being rigidly fixed to the upper end of the sleeve in any suitable manner. While the support plate thus resists downward displacement of the sleeve, upward displacement thereof is resisted by means including a retention or index member 58 the structure, mode of attachment to the sleeve and purpose of which will be described hereinafter.

Figure 16:
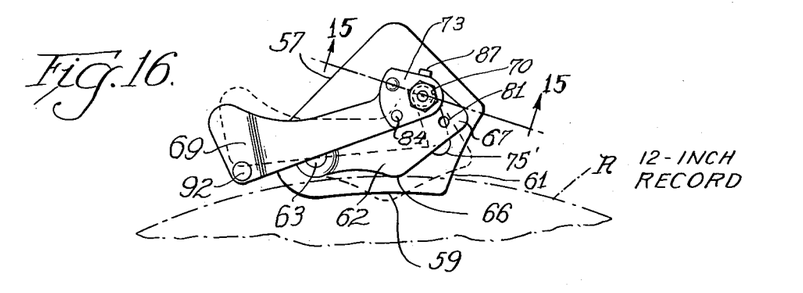
Figs. 16, 17 and 18 are diagrammatic plan views of elements of the ejector head showing the provisions made for supporting three different sized records.

In addition to the function already referred to, the support plate 57 is adapted to provide magazine support for records differing in size, such as those of 10-inch and/or 12-inch diameter at their peripheral edges, while the center holes of the records are threaded over the spindle 36. To understand how this is effected, reference should be made to Figs. 16 and 17 wherein the support plate 57 is shown in top plan view. As will be noted, it is an irregular four-sided figure in general formation and is adapted to be swung, with sleeve 52, between the positions indicated in Figs. 16 and 17. In Fig. 16, a 12-inch record R is shown resting on one of the long edges 59 of plate 57, while in Fig. 17 a 10-inch record R' rests on one of the shorter edges 61, either of these sized records being also supported on the spindle shoulder 47.

Figure 17:
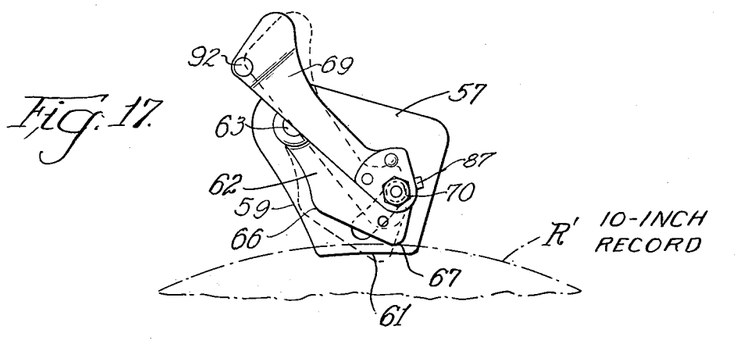

Immediately associated with the support plate 57 is an ejector plate, push plate or arm 62 (Fig. 16). It is rigidly supported at one end thereof on an ejector shaft 63 which is, in turn, journalled in the sleeve 52. The push plate 62 is restrained from displacement away from the supoprt plate 57 by a hub portion 64 (Fig. 13) pinned to the lower end of shaft 63 and is positioned adjacent the member 58. Normally, by means later to be described, the push plate is spaced both from edge 59 and edge 61 so that regardless of whether a 10-inch or a 12-inch record is positioned on the magazine, the record will rest on the support plate without interference by the push plate. When, however, the shaft 63 is rocked clockwise (Fig. 16), by means later to be described, a corner 66 of the push plate is swung over the edge 59 to dislodge a bottom record from a stack of 12-inch records, as shown by the dashed lines. Concurrently, in this motion of the push plate, a second corner 67 is carried over the edge 61, which operation is adapted to dislodge a 10-inch record from the spindle (Fig. 17).

Figures 12, 13:
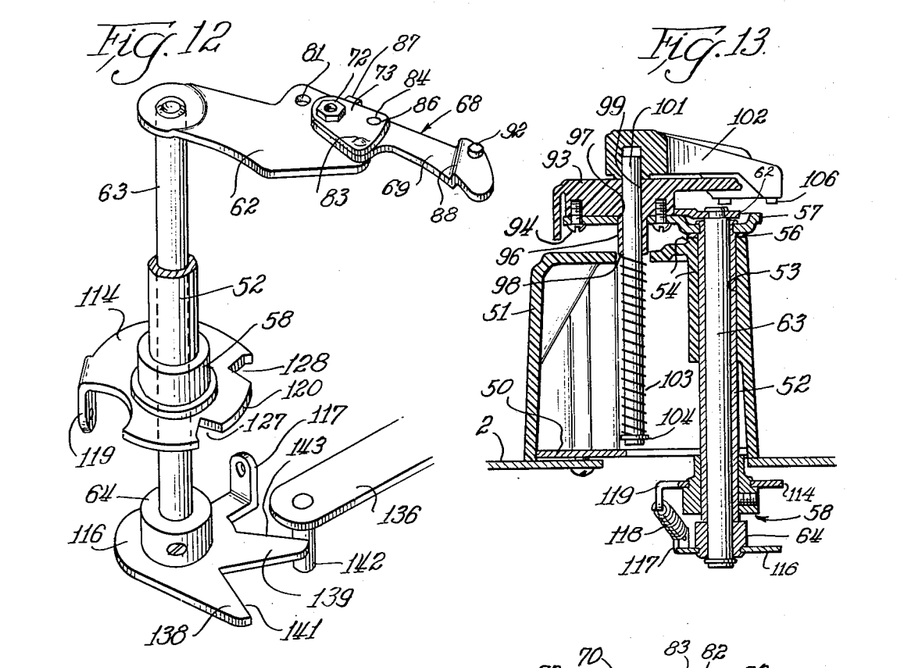
Fig. 12 is a fragmentary perspective view of specific elements of the ejector mechanism.
Fig. 13 is a fragmentary vertical sectional view on line 13—13 of Fig. 1.
Figures 14, 15:
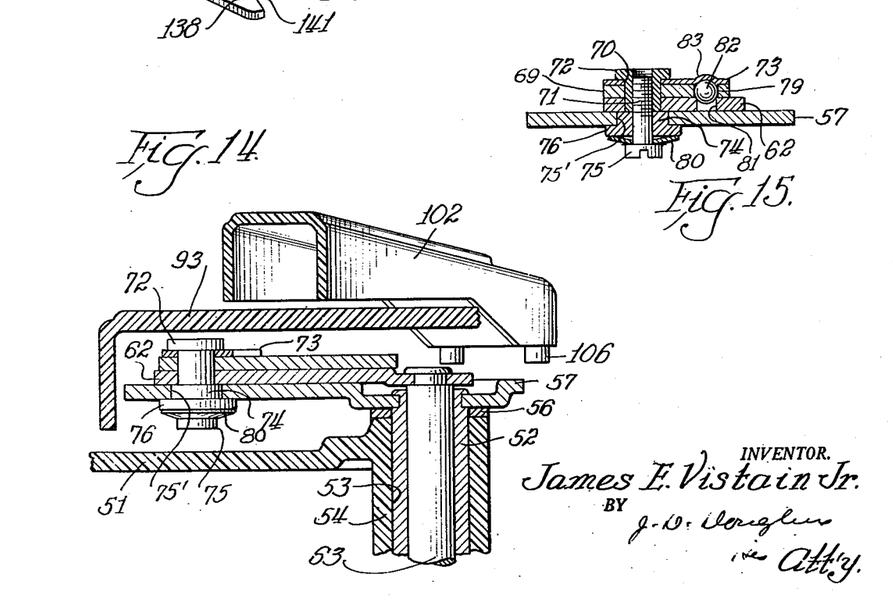
Fig. 14 is a fragmentary vertical sectional view, drawn to an enlarged scale, of mechanism shown in Fig. 13, the section being taken on the plane of the vertical rock shaft and the pivotal connection between the record support and ejector plates.
Fig. 15 is a vertical sectional view on line 15—15 of Fig. 16.
Figure 18:
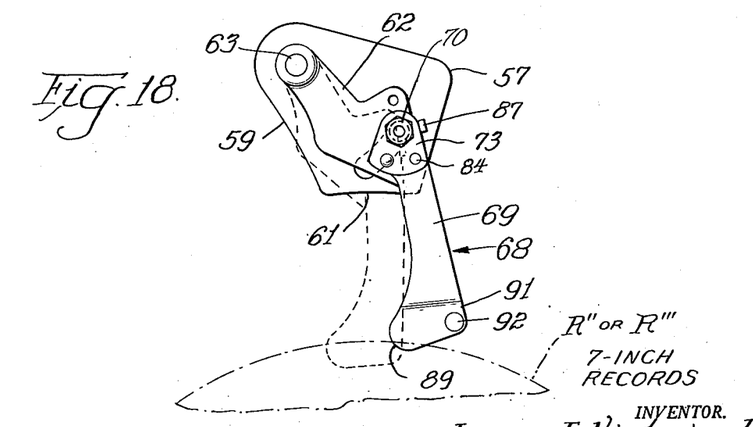

Novel means is provided to afford peripheral support for a record smaller than one of 10-inch diameter, such as one of 7-inch diameter, while it is supported at its center by the spindle. Said means involves use of a combined support and ejector mechanism 68 (Figs. 12 and 18). It includes a swingable arm 69 which is pivotally coupled to the pusher arm 62 by means including a screw 71 (Fig. 15) having a head 75. It is threaded in a nut 70 of tubular formation having a head 72 adapted to receive a wrench. The nut 70 passes freely through a spring plate 73 and arms 69 and 62. The screw 71 passes freely through a bushing 74 which, in turn, passes through support plate 57. The bushing 74 is of length, from its upper extremity to a flange 76 at its lower end, slightly greater than the thickness of plate 57. Correspondingly, the nut 70, from its lower extremity to its head 72 is slightly longer than the combined thickness of plate 73, arms 69 and 62 so that when the nut is clamped against bushing 74 by screw 71, the plate 73, arms 69 and 62 have freedom for rotary motion with respect to each other and with respect to plate 57. The bushing 74 further passes through a slot 75' (Fig. 16), in plate 57, which is arcuate of the axis of sleeve 52 both to afford motion of the arm 62 with respect to plate 57 and to movably anchor the arm thereto.

The combined support and ejector mechanism is operable as support for a 7-inch record only when said mechanism is in a predetermined position. This can best be understood by comparing Figs. 16, 17 and 18. The arm 69 is provided with a hole 79 (Fig. 15) and the arm 62 is provided with a pair of smaller diameter angularly spaced holes 81, the three of which are on an arc taken about the axis of screw 71. A ball 82 is received in the hole 79 in arm 69. The ball is of diameter greater than the thickness of arm 69 so that a portion of the ball is adapted to extend alternately into either of the two holes 81 in the ejector arm 62, the holes 81 merely affording seats for the ball since said holes are of diameter smaller than that of the ball. The seating of ball 82 is, of course, assured by force of the spring plate 73, which may, if desired, have a bearing portion provided by a dent or dimple 83 against which the ball rests. A spring washer 80 seated between the screw head 75 and bushing 74 provides additional resilient holding of the ball in its seats. When playing 10-inch and 12-inch records the arm must not, of course, extend over either of the corners 67 or 66. Therefore, it is swung to the position it occupies in Figs. 16 and 17 wherein one of the holes 81 is in engagement with the ball 82. The other of the holes 81 engages the ball when arm 69 is swung to its unfolded position shown in Fig. 18. In swinging the arm 69 between these two positions, forces are exerted which tend to cause displacement of the spring plate 73 edgewise with respect to arm 69. To resist this tendency the arm 69 bears a pin 84 extending upward into a hole 86 in the spring plate.

Additionally, as a precaution against manually swinging the arm 69 counterclockwise beyond its Fig. 18 position, so that the ball will not drop from hole 79, a stop is employed. This stop may take the form of a lug 87 struck upward from the edge of ejector arm 62 past which the end of the arm 69 will travel freely but which will holdingly engage the side of the arm as it reaches the position of Fig. 18.

The operation of releasing the lowermost record from a stack of 7-inch records supported by the spindle shoulder 47 and free end of arm 69 is carried out as follows: The free end is offset upwardly at 88 (Fig. 12), to provide approximately the same slope for a stack of 7-inch records as for a stack of 10-inch records when they are supported by the spindle 36. Additionally, the arm 69 is slightly L-shaped (Fig. 18) to afford a toe portion 89 on which the peripheral region of a 7-inch record is adapted to rest while the center is supported by the spindle. A heel portion 91, of the arm 69, bears a stud 92 on the upper side thereof which, during record playing is in spaced relationship to the records carried by toe portion 89. The stud 92 should extend upward enough to provide engagement with only the bottommost record of the stack, which is thereby kicked from shoulder 47 when the arm 69 is cyclically moved from its full line to the broken line position Fig. 18, without interference with the record immediately above the bottommost record.

Although records of the 7-inch variety are not susceptible of tipping about their support on the spindle shoulder 47, records of the 10-inch and 12-inch variety are occasionally heavy on one side thus calling for additional means to retain them in engagement with the support plate 57. Therefore, hold-down mechanism is incorporated in the ejector head 48. It includes a bearing cap 93 which may be of molded plastic material such as Bakelite which is anchored to the support plate 57 by screws 94 at one side of said plate. The cap 93 also includes a boss 96 extending downward from the top thereof, through an aperture 97 in the support plate 57 and into a clearance slot 98, in the top of the casing 51, which is arcuate of the shaft 52. The boss has, coaxially thereof, a bore 99 in which a hold-down shaft 101 is journalled for rotary and axial movement. From the upper end of the shaft 101, a hold-down arm 102 extends laterally. The arm 102 is biased into the position indicated in Fig. 13 by a spring 103 coiled about shaft 101 on which the spring is confined between the lower end of boss 96 and a suitable fastener, such as a C-washer 104 fixed to the lower end of said shaft.

Before records are positioned on the support plate 57, the arm 102 is swung laterally for the sake of clearance. The magazine means provided by the ejector head 48 and spindle 49 having been loaded with a stack of records the arm 102 is lifted, against the resistance of spring 103, swung over the stack of records and lowered into engagement therewith. If desired, one or more resilient contactors 106 may extend down from the outer end of arm 102 to engage the records to avoid scratching the same.

Special provision (Figs. 1 and 3) is made for reproducing 7-inch records R''' having a large center hole 107, 1½" in diameter. The center hole of a record of this description is provided with an adapter 108 (Fig. 1) which is no part of the present invention. It should be noted, however, that adapter 108 includes a plurality of legs 109 spiraling outward from a central region through which a hole 111 (Fig. 3) is formed for accommodation of the spindle portion 49. The outer ends of legs 108 have circumferential grooves at 112 (Fig. 3) which are biased into engagement with a complementary edge 113 of reduced thickness and which defines the center hole 107.

The support plate 57, ejector arm 62 and auxiliary arm 69, as previously indicated, are adapted to swing together between the Fig. 16 and Fig. 17 positions, although the arm 62 is movable with respect to plate 57 in the course of a record changing cycle. In order to understand the reason for this, it should be noted that the member 58 (Fig. 12) takes the form of a hub for an index plate 114 thereon, the hub being rigidly clamped to the sleeve 52. Member 64 takes the form of another hub, rigidly associated with shaft 63, and bears a prong plate 116 having a radial arm 117 extending upward. The ejector arm 62 is biased counterclockwise by a tension spring 118 (Fig. 13) anchored between arm 117 and an arm 118 extending downward from the index plate 114, rotation of the ejector arm due to the force of spring 118 being limited by engagement of bushing 74 with one end of the slot 75'.

The support plate 57 and ejector arm 62 are also collectively adapted to be removably retained in either of the stations indicated in Figs. 16 and 17. This is effected by means including a pin 121 (Fig. 8) in association with an L-shaped arm 122 which is adapted to swing about a stud or post 123 on the base plate. Pin 121 extends downward and is biased into engagement with the index plate 114 by a deflection spring 124, one of the ends of which is anchored to the post 123 while its remaining end is pressed against a second stud 126, on plate 2. As the ejector arm 62 and support plate 57 are together rotated between the Fig. 16 and Fig. 17 positions, the pin 121 rides over a smooth unbroken curvilinear edge 120 of index plate 114. As the support plate 57 is swung to the Fig. 16 position, pin 121 concurrently moves over edge 120 and is snapped into a notch 127 in the index plate 114. Similarly, moving the support plate to its Fig. 17 position carries a second notch 128, on the index plate, to a point where it is adapted to be releasably engaged by the pin 121. Adjacent sides of the notches 127 and 128 are of such formation that they readily move the pin out of engagement with them as the index plate is manually rotated.

Figure 8A:
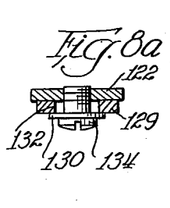
Fig. 8a is a vertical sectional view taken on line 8a—8a of Fig. 8.

The position of pin 121 with respect to post 123 is adapted to be adjusted to compensate for deficiencies in manufacture. Therefore, pin 121 is not carried directly by the L-shaped arm 122. Instead, it is carried at one end of a link 129, the opposite end of which is pivoted at 131 to the free end of L-shaped arm 122. Between its respective ends, link 129 has a short slot 132 (Fig. 8a) through which loosely passes a screw 134 threaded in the arm 122. By loosening screw 134 and then moving the support plate 57 to the most desired position with respect to spindle 49 before screw 134 is again tightened, it is possible to compensate for angular irregularities in the positions of the support and push plate. If desired, a lock washer 130 may be used on the screw 134 to secure link 129 more tightly to arm 122.

The ejector arm 62 is operated against the resistance of spring 118. This is effected as a lever 136 (Figs. 8 and 12) is swung about a pin 137 on the base plate wall 8, the swinging motion being imparted to the lever by cyclically operative mechanism to be described hereinafter. For translating swinging of lever 136 into rocking motion of shaft 63, the prong plate bears a pair of prongs 138 and 139 (Fig. 12) somewhat below the plane in which the adjacent end of lever 136 is adapted to swing. The prong 138 has a cam surface 141 adapted to be operatively engaged by a follower 142 on the end of lever 136, when the support plate 57 is positioned for support of a 12-inch record. Similarly, the prong 139 has a cam surface 143, In operation, as the follower 142 is carried laterally by movement of the lever 136, it engages one or the other of the cam surfaces 141 and 143 dependent on the size of record being played. As the lever 136 is moved still further, the follower 142 slides on the cam surface and causes the prong plate 116 to turn the shaft 63, thus operating the ejector. As noted, the cam surface will be kept in spring pressed engagement with the follower by the spring 118 which will also cause the ejector arm 62 to return to its original position as the lever 136 is swung back.

Figures 9, 9A, 10, 11:
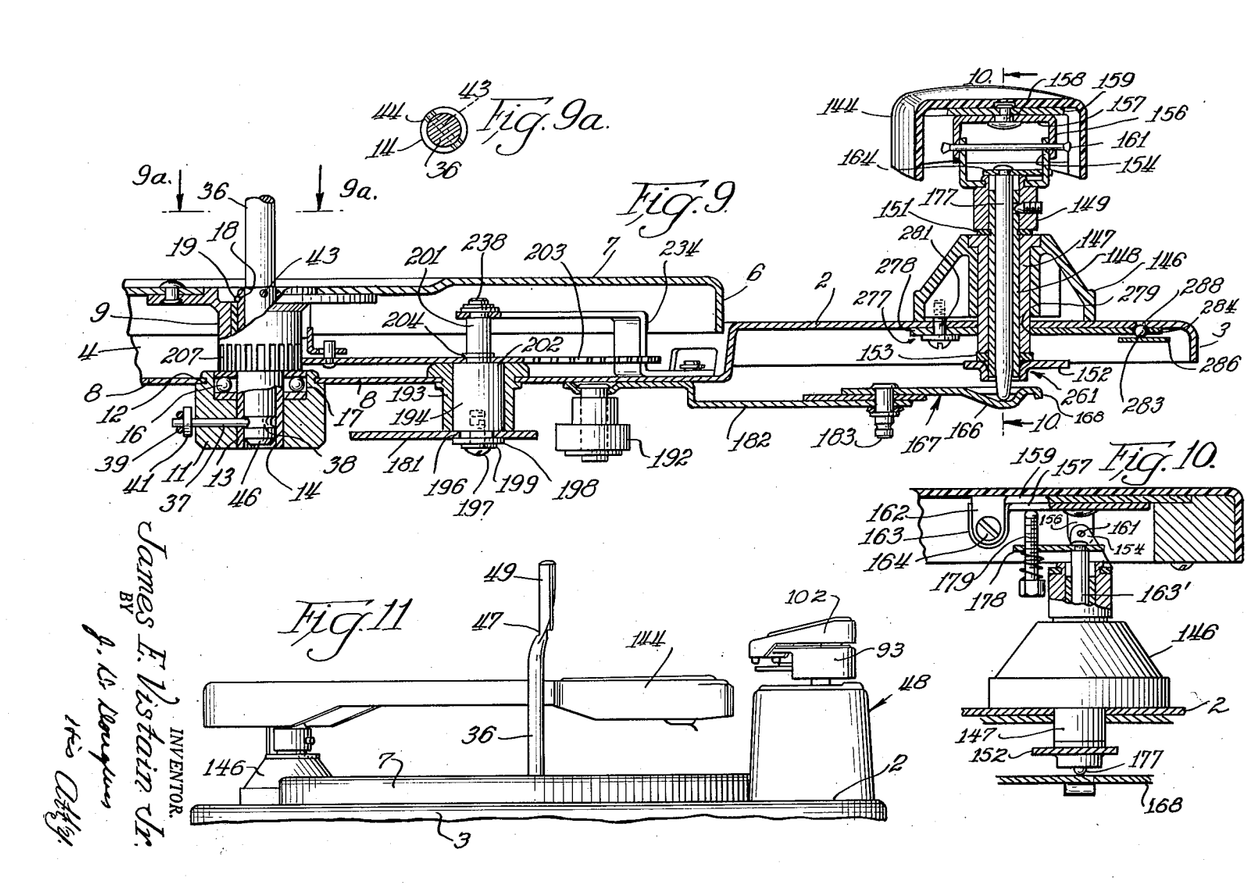
Fig. 9 is a vertical sectional view taken on line 9—9 of Fig. 8.
Fig. 9a is a horizontal sectional view taken on line 9a—9a of Fig. 9.
Fig. 10 is a vertical section on line 10—10 of Fig. 9 showing the tone arm when the record player is in cycle.
Fig. 11 is a fragmentary view of the record player, in side elevation.

The record player includes a pickup arm 144 supported by a pedestal 146, bolted to the base plate 2 (Fig. 9). The pedestal is formed of some suitable plastic material, such as Bakelite with a bushing 147 molded therein extending downward to a point below the level of the base plate. The bushing 147 affords bearing support for a sleeve 148 downward displacement of which, with respect to the pedestal, is resisted by a hub 149 clamped to the upper end thereof. The hub also being spaced from the bushing by a bearing washer 151. Upward displacement of sleeve 148 with respect to the pedestal is prevented by an arm control lever or crank arm 152, rigidly coupled to the sleeve, and spaced from the bushing 148 by an annular spacer 153.

The upper end of hub 149 bears a pair of arms 154 which extend away from each other, thence upwardly and are embraced by a pair of arms 156 extending downward from a pivot plate 157. A pin 161, passing through the arms 156 and 154, affords a horizontal axis about which the pickup arm is adapted to rock. The plate 157 is pivotally secured at 158 to a carrier plate 159 attached, in any suitable manner, to the pickup arm 144. An ear 162 (Fig. 10) bent downward from plate 159, is opposite an ear 163 in downward extension from the plate 157. The ears are coupled by an adjustment screw 164 which passes freely through ear 162, but is threaded in ear 163. Thus, the screw 164 serves to draw the ears toward each other to move the pickup arm 144 in one direction about pivot 158. A compression spring, not shown, coiled about screw 164 between the ears, is utilized to swing the pickup arm in the opposite direction about pivot 158 when the clamping force of screw 164 is relieved. The pickup arm, therefore, may be effectively adjusted about pivot 158, independently of sleeve 148 for proper initial engagement of the pickup arm with the beginning of the sound groove of a record. Means by which the pickup arm is moved automatically will be described hereinafter.

Figure 19:
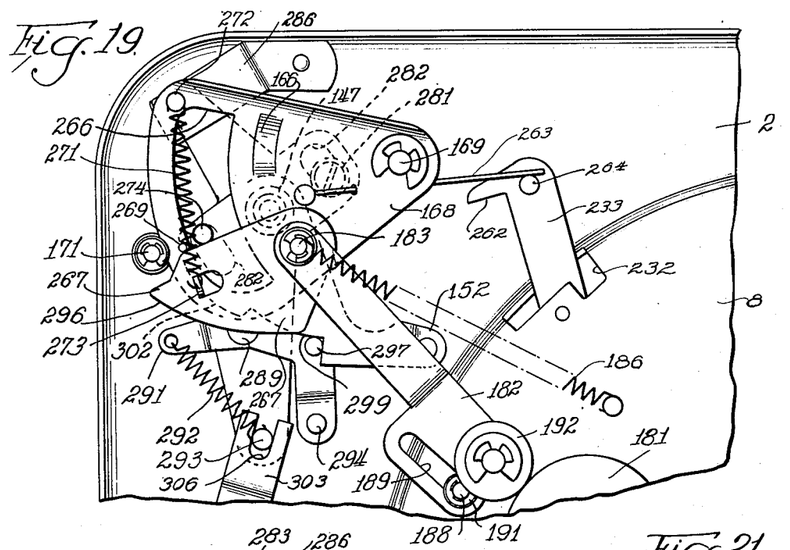
Figs. 19 and 20 are fragmentary bottom plan views, drawn to an enlarged scale, of mechanism shown in Fig. 8 to indicate the means employed for lowering the pickup arm into initial engagement with any one of three different sizes of records.

The pickup arm 144 is adapted to be rocked automatically in response to movement of a vertically effective cam 166 (Fig. 9). This cam is carried by a swing-out mechanism which is indicated in its entirety by the reference character 167 and includes a swing-out plate 168 (Figs. 19 and 20) which is triangular in general contour and which is adapted to be swung about an axis provided by a pin 169 on the base plate 2. That edge of plate 168 which is remote from pin 169 is arcuate of the pin in order that the plate may be additionally supported as follows: A stud 171 extends downward from the base plate 2 (Fig. 21) adjacent the edge of the plate. The lower end of the stud is of reduced diameter to provide a neck 172 and a shoulder 173. During its motion, the plate 168 is confined between shoulder 173 and a washer 174 on neck 172, the washer being fastened on the neck by a C-washer 176.

The horizontal angular motion of swing-out mechanism 167 is translated into vertical motion of a lift pin 177 (Fig. 9), slidably journalled in the sleeve 148, by the cam 166. The pin 177 bears at its upper end an arm 178 (Fig. 10) in the free end of which is threaded an adjustment screw 179 adapted to engage the plate 157 and to thereby rock the pickup arm about pin 161 as cam 166 is operated in a manner well-known in the art.

The operation of the swing-out mechanism 167 is cyclical and is effected by a master cam 181 (Fig. 8) the support of which will later be described in detail. Motion from the master cam 181 is conveyed to the swing-out mechanism 167 by a link 182 which is slidably anchored to the base plate and pivotally coupled to plate 168 by a pin 183 thereon. Additionally, the pin 183 provides, together with a post 184, support for a tension spring 186 to bias a follower 192, on the end of link 182, toward cam 181 for cooperation therewith. The link 182 is coupled to the base plate by a stud 188 on the wall 8, which extends through a slot 189 in said link, a fastener 191 on the stud precluding removal of the link therefrom.

The master cam 181 is intermittently driven from the constantly driven turntable hub 9. The means used to accomplish this is most clearly shown in Fig. 9 wherein it will be noted that a bushing 193 is rigidly fastened to the wall 8 in any convenient manner. The bushing 193 provides bearing support for a stub shaft 194 having a lower end portion partly defined by opposed flat surfaces 196 which cooperate with complementary surfaces on the cam through which the surfaces 196 extend to resist rotation of the cam on said shaft, a screw 197, washer 198 and lock washer 199 also being provided to secure the cam to the stub shaft. At its upper end, the stub shaft 194 is of reduced diameter at 201, thereby providing a shoulder 202 against which a mutilated gear 203 is clamped in any convenient manner, such as by a C-washer 204. Flat surfaces, similar to the surfaces 196, may also be provided to prevent the gear 203 from turning on the shaft 201.

The gear 203 has a blank space 206 (Fig. 4) at its periphery. The blank space is normally stationed, during record playing, adjacent a pinion 207 formed at the lower end of the turntable hub 9. This position is maintained by means including a lever 208 having a notch 209 on one edge adjacent its end. The arm 208 is biased counterclockwise about a pivot 211, on wall 8, by a tension spring 212 but is limited in its counterclockwise motion by stop means taking the form of a pin 213 on the wall 8. The notch 209 is adapted to be engaged by a pin 214 extending downwardly from the lower side of gear 203 so that as the pin 214 is carried through its orbit in the course of a cycle of motion, it rides over the edge of arm 208 which is thereby moved against resistance of spring 212 until the notch 209 is engaged by pin 214, at which time the blank space 206 being opposite pinion 207 there is no driving relationship between pinion and gear.

Figure 7:
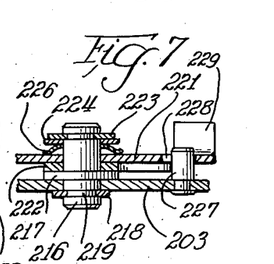
Fig. 7 is a fragmentary vertical sectional view on line 7—7 of Fig. 6.

In order to start the gear 203, it must be moved sufficiently far for the teeth of the gear to mesh with the driven pinion 207. Therefore, special mechanism, carried by the gear 203, is provided to move the blank 206 past pinion 207. Suitable mechanism for doing so includes a stud shaft 216 (Fig. 7) carried by gear 203 adjacent the periphery thereof. Shaft 216 extends through the gear 203 and has a flange 217 which rests against the upper side of gear 203. Just below the gear, the shaft is pinched by a C-washer 218 at an annular groove 219 to anchor the shaft to the gear. From the flange 217, shaft 216 extends through and provides a bearing for an actuator lever 221 and a preset lever 222 both of which are retained on shaft 216 preferably by a C-washer 223 between which and lever 221 the shaft carries a plain washer 224 and a resilient washer 226. Because of the force of washer 226, there is enough friction between the levers 221 and 222 so that the lever 222, when moved, is adapted to carry with it the lever 221, although one of the levers is adapted to be moved relative to the other by mechanism later to be described. The extent to which lever 221 will swing about shaft 216 is limited by a pin 227 (Fig. 5) extending upward from gear 203 through an aperture 228 in lever 221, of diameter substantially greater than the diameter of pin 227. Thus, the movement of the lever 221 is greatly restricted while the lever 222 may be swung through a considerable arc.

An abutment lug 229 is struck upwardly from the lever 221 and is adapted to occupy two distinct positions at the limits of the restricted movement of that lever. The lug 229 extends into a horizontal plane through which a striker member 231 (Fig. 4) on the hub 9 is carried with the turntable hub 9. Normally, that is, when a record is being reproduced, lug 229 is positioned outside the orbit through which striker 231 is carried. When, however, lever 221 is moved counterclockwise to its other limit of movement, lug 229 is carried into the orbit of striker 231 which moves the gear sufficiently to carry the teeth into mesh with pinion 207. There upon the gear 203 is driven through a single revolution until pin 214 is intercepted by notch 209 on lever 208 and the blank 206 is again stationed at the pinion. Lever 221 may be swung from its inactive position to its operative position to initiate cyclic motion of gear 203 either manually or automatically.

The automatic means by which cyclic motion is initiated is best shown in Figs. 4 to 8 inclusive. Therein it will be noted that the base plate 2 is apertured at 232 in order that a longitudinally slidable member 233 may have freedom of movement under the base plate 2 and over the wall 8. Additionally, member 233 is offset at 234 (Fig. 9) so that it may pass over the gear 203 and levers 221 and 222. The movement of member 233 may preferably be in a course diametrical of the axis of gear 203. This is assured by a stud 236, on wall 8 adjacent aperture 232, which passes through a first slot 237, in member 233, and a section 238 of shaft 194, additionally reduced in diameter, which passes through a second slot 239 in the slidable member. Suitable means such as C-washers 241 are provided on section 238 and stud 236 to resist removal of member 233 from its supports.

At the beginning of reproduction of a record, the slidable member 233 is in the position in which it is indicated in Fig. 4. In that position, a follower 242, extending downward from the end of slidable member 233, is in spaced relationship to the lever 222. As the pickup arm 144 is carried inwardly by the sound grooves of the record it is tracking, the slidable member 233 is gradually carried outward, the means by which this pickup arm motion is communicated to the member 233 being described hereinafter. In the course of its outward movement, follower 242 engages lever 222 which is rotated counterclockwise carrying the lever 221 with it. This movement results in the lug 229 being carried toward the orbit of striker 231. At the point of initial engagement of lever 222 by stud 242, the levers 221 and 222 are in extended or unfolded relationship to each other; that is, lever 221 occupies a position beyond which it may be rotated no farther counterclockwise because of the stud 227. The follower 242 first engages the lever 222 toward the end of the sound grooves. The initial engagement of lug 229 by striker 231 is not, however, adequate to move gear 203 since the engagement is of a brushing nature, the slightly rounded tip of the striker 281 merely brushing back the lever 221, and merely produces an ever increasing folding relationship between the levers at each rotation of the turntable. When, however, the pickup arm enters the trip groove of a record, the movement of lug 229 takes place at a much faster rate and is carried inwardly so far and so quickly before the striker has a chance to engage it that when eventually the striker does engage the lug, it is engaged not by the tip of the striker, but by the radial side thereof. A push is thus delivered to the lug which is translated into an increment of rotary motion of the gear and this increment of motion is adequate to provide meshing engagement thereof with the pinion 207 for a revolution of said gear.

As was previously indicated, a cycle of rotation of gear 203 is adapted to be initiated manually. The means by which this is carried out includes a lever 243 (Fig. 4). It extends beneath the base plate 2 to which it is pivoted at 244. Additionally, lever 243 extends through a clearance aperture 246 to an offset 247, which is required so that the lever is adapted to reach over the levers 221 and 222. A pin 248 on the lower side of lever 243 extends through a slot 249, in wall 8, while a tension spring 251 anchored to said pin below wall 8 is adapted to bias the lever counterclockwise, movement thereof being limited by the edge of slot 249. At its inner end, the lever 243 carries a stud 250 which extends downward and is adapted to be carried into engagement with a cam shaped surface 252 on the lever 221. This may be carried out by moving a handle 253, above the base plate 2, against the resistance of spring 251, since the handle is coupled to the lever 243 by a vertical rod 254 (Fig. 2) in extension through a slot 256 in the base plate 2. It will now be noted that, as stud 250 is carried from its normal position and into engagement with cam surface 252, lever 221 is moved from its normal position, counterclockwise, in which operation lug 229 is carried into the position wherein it is adapted to be operatively engaged by striker member 231. This operation can, of course, be performed at any time during the operation of the record player and results in manipulation of the pickup arm automatically, accompanied by release of a record from the ejector mechanism 48 and the spindle 49.

Figure 5:
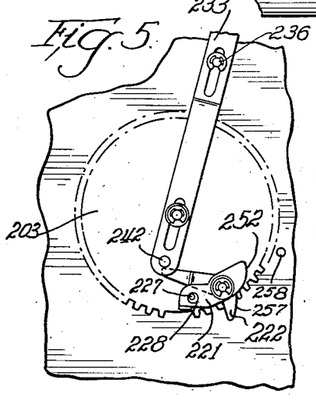
Fig. 5 is a fragmentary view of specific parts shown in Fig. 4, said parts being in a different position.
Figure 6:
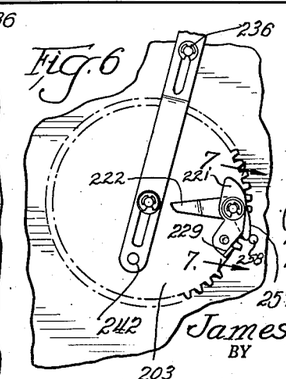
Fig. 6 is also a fragmentary view corresponding to Fig. 5, the parts being in a position differing from the positions indicated in Figs. 4 and 5.

In the course of a single revolution of gear 203, levers 221 and 222 are returned to their original or normal positions. This is carried out as follows: As meshing engagement between gear 203 and pinion 207 is initiated lever 222 is carried against follower 242 and rotated counterclockwise to the position in which it is indicated in Fig. 5. After lever 222 has been thus swung counterclockwise, and before said lever has been carried out of engagement with follower 242, the direction of motion of member 233 is reversed, by mechanism later to be described. This operation, of course, entails additional folding relationship between levers 221 and 222 during which a cam portion 257 at one edge of lever 222 is extended beyond the teeth of gear 203. At this point in the rotation of gear 203, lever 221 is in one of its extreme positions. In the course of additional gear rotation cam portion 257 strikes a stop 258 which serves to swing lever 222 back to its normal position in which operation friction between levers 221 and 222 is adequate to return lever 221 to its normal position. With the exception of the operation of lever 208, in arresting motion of gear 203, as already described, this is the order of operation of the mechanism by which a record changing cycle is carried out.

As was previously indicated, sleeve 148 (Fig. 9) carries a crank arm 152. It is of novel construction and bears at its free end a crank pin 259 (Fig. 20) extending downward. The pin 259, arm 152 and sleeve 148, in assembly, may be referred to as a crank mechanism 261. As mechanism 261 is carried by the pickup arm in the course of playing a record, the pin 259 is carried into engagement with a lug or hook 262, laterally of the end of member 233 which is thereby moved outwardly from its normal position to one of its extreme positions. This movement causes the stud 242 to trip the lever 222 and start the mechanism as described above. In the course of this movement, the slidable member 233 carries a pin 264, extending downward from the outer end of said member, into juxtaposition with a feeler member 263, extending horizontally from the arm 168, so that the pin 264 is in readiness to be engaged by the feeler immediately the swing-out mechanism starts its cyclic motion. This ensuing motion of the feeler 263 returns member 233 to its normal position. Preferably, the feeler 263 may be of resilient material such as steel piano wire both because of the possibility of premature engagement of the feeler by the pin 264 and also as a safety precaution should the movement of pickup arm 144 be arbitrarily resisted manually while gear 203 is in motion. In the latter case, the feeler member 263 is adapted to bend and eventually return to its original form without undergoing deformation or fracture when the pickup arm is released.

Figures 20, 21:
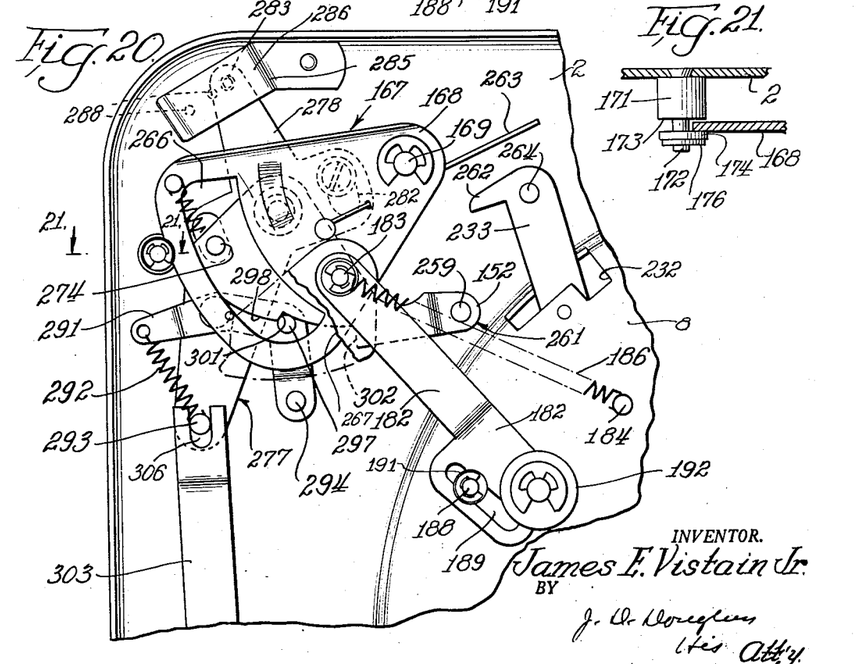
Fig. 21 is a sectional view taken on line 21—21 of Fig. 20.

In order that the pickup arm may be manipulated when a record is rejected, the plate 168 is provided with a slot 266 which is arcuate of the pivot 169 of the swing-out mechanism. One end of the slot 266 is covered by a safety contactor 267 adapted to swing about the pin 183 on which the contactor is retained in any convenient manner. The contactor 267 is normally adapted to occupy a predetermined position with respect to plate 168 which is maintained by a pin 269, on plate 168, against which the contactor is biased by a tension spring 271 anchored between a second pin 272, on plate 168, and an ear 273 on the contactor 267. During reproduction of a record the swing-out mechanism 167 occupies approximately the position in which it is shown in Fig. 20. When, however, cyclic motion of the swing-out mechanism has been initiated, and the pickup arm 144 consequently rocked upward by the lift cam 166, the contactor 267 is carried into engagement with a pin 274 on the crank arm 152, the pin 274 being adapted to be carried laterally within the limits of slot 266. The clockwise motion of the swing-out mechanism 167 is thus communicated to the pickup arm, to swing it outward, by cooperation between the contactor and pin 274. Under normal conditions when playing records, the tension of spring 271 is adequate to maintain engagement between contactor 267 and pin 269. Should the pickup arm be grasped and held stationary, however, while the swing-out mechanism is being rotated through the clockwise part of its cycle the contactor 168 is moved away from pin 269 but is, of course, adapted to be eventually returned to its position of abutment with said pin when the pickup arm is released, without any of the parts undergoing deformation or fracture.

Figure 26:
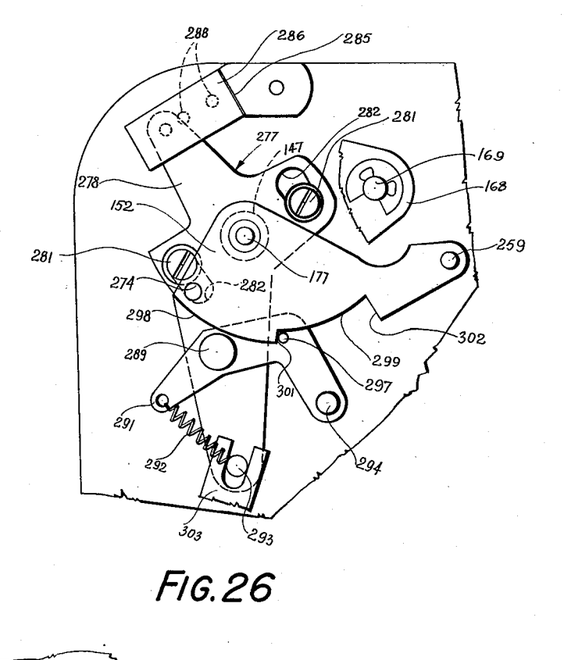
Fig. 26 is a view similar to Fig. 19, parts being broken away to show the pickup arm positioning cams.

To govern the position of the pickup arm 144 once it has been automatically removed from engagement with a record it has been tracking, a positioning mechanism 277 (Figs. 9 and 26) is provided. It is associated with the bushing 147 of the pickup arm pedestal 146 and comprises a carrier lever 278 which is apertured, centrally thereof, by a hole 279 through which the bushing extends as a bearing for the positioning mechanism. Said mechanism is intimately associated with the base plate 2 by a pair of screws 281, threaded therein, but passing freely through a pair of slots 282 (Fig. 19) in the carrier lever 278, the slots being arcuate of the axis of bushing 147. For a reason later to be indicated, carrier lever 278 is adapted to be releasably retained in any one of three predetermined positions with respect to the base plate 2. This is effected by detent means comprising a ball 283 (Fig. 9) which is carried in a hole 284, at one end of lever 278. The ball 283 is retained in the hole 284 by a bracket 286, on the base plate 2, which is offset at 285 so that it is adapted to extend beneath the arm 278. The bracket 286 is of resilient metal so that it is adapted to press ball 283 yieldably into engagement with one of three seats provided by holes 288, in the base plate of diameter less than the diameter of the ball 283. Each of the holes 288 is at one of the predetermined positions which lever 278 is adapted to occupy. Since the holes 288 are on an arc through which the ball is swingable, the force of the spring plate is adapted to retain lever 278 in any one of the foregoing positions until moved manually therefrom through means to be described hereinafter. Remote from the spring plate 286 and the sleeve 147, lever 278 bears, pivoted thereto at 289, a bell crank lever or follower lever 291. Lever 291 is biased counterclockwise about its pivotal axis by a tension spring 292 anchored between one end of said lever and a coupling pin 293 extending downward from one end of lever 278. During reproduction of a record, the spring 292 is responsible for engagement of a follower 294, on another end of lever 291, with a cam surface 296 at the edge of the contactor 267 (Fig. 8). During this association of the cam surface and follower a second follower 297, extending downwardly from the lever 291 is retained in disengaged relationship to the crank arm 152. When cyclic operation of the mutilated gear 203 has been initiated, however, the spring 292 moves follower 297 into cooperative association with the crank arm 152. This is due to the outward or clockwise motion (Fig. 19) of the swing-out mechanism during which cam surface 296 is carried out of engagement with the follower 294. By the time this operation has taken place, pickup arm 144 has been lifted out of engagement with the record it has been tracking by the previously described mechanism including the cam 166. Just before cam 296 is disengaged from follower 294, follower 297 is engaged by the crank arm 152 with which there is adequate friction to resist any tendency on the part of the pickup arm to oscillate about its vertical axis, assuming the base plate to be substantially level when the pickup arm is freed from engagement with the record. After the contactor member 267 has been carried away from follower 294, it engages pin 274 to swing crank arm 251 with respect to follower 297. This involves movement of a cam surface 298, in engagement with follower 297, until passing of a shoulder 301, at the end of said cam surface, enables the follower to snap into engagement with another cam surface 299 (Fig. 26). Cam 299 extends in a spiral manner, with respect to the axis of lift pin 177, from the shoulder 301 to a second shoulder 302, on the crank arm, the function of which, among others, will now be described.

Safety devices to protect the mechanism when the pickup arm is moved improperly is provided by the structure of the swing-out mechanism 167 and crank mechanism 152. If, for instance, the pickup arm is moved outwardly beyond the record it is playing, pin 274 on the crank arm would be carried clockwise to the end of slot 266 where it would engage plate 168 of the swing-out mechanism which would be swung against the resistance of spring 186. At the same time, the cam surface 299 engages the follower 297 which is thereby displaced clockwise about pivot 289 against the resistance of spring 292 until the movement of the pickup arm is limited on engagement of shoulder 302 with follower 297. On release of the pickup arm the spring 292 returns the follower to the position governed by follower 274 as it engages the contactor 267, without injury to any of the machine parts. From its position at any point while in engagement with a record the pickup arm may, of course, be removed inward as far as engagement with the spindle will permit the pickup arm to be moved. As has already been explained, the spring 271 is adapted to undergo elongation to permit the pickup arm to be arbitrarily held stationary during a record changing cycle. Movement of the pickup arm inwardly during a changing cycle results in the same effects on the mechanism, since the slot 266 is so proportioned that movement of the pin 274 and therefore of the pickup arm inwardly is never restrained thereby. The only inward restraint being by the plate 267 in response to the urging of the spring 292.

Cooperation between shoulder 301, on the crank arm 152 and follower 297 determines the point at which the pickup arm is stopped on its inward movement at the end of a record changing cycle. During the cycle, the pickup arm is held in a raised position by the action of the lift cam 166. In this position, it may be moved laterally by engagement between the cams and followers in connection with the crank arm 152. As the arm is swung outward by the engagement between the plate 267 and pin 274, the follower pin 297 comes into engagement with the surface of the plate 267 and at the end of the outward swing will be engaged with the cam surface 199. As the master cam 181 allows spring 186 to return the swing-out mechanism 167 to its position, the spring 292 will cause the follower 297 to press on the spiral cam surfaces 259, causing the crank member 152 to rotate the pickup arm inwardly until the follower reaches the shoulder 301. Here the arm is normally retained by the shoulder until lowered by the cam 166 to start playing the next record.

The force of spring 292 tending to move the pickup arm further is resisted by engagement between the follower 297 and shoulder 301, as just described. However, because of the shallow notch provided by the shoulder 301, and because of the slight slope of the shoulder, the pickup arm is not held positively. Arbitrary manual movement inwardly will cause the follower 297 to ride up the shoulder 301 onto the surfaces 298. The shoulder 302, in contrast to the shoulder 301, is much higher and provides with cam 299, a hook means adequate to retain the crank arm in engagement with follower 297 when said crank arm is moved clockwise if the pickup arm is moved arbitrarily outward.

Figure 27:
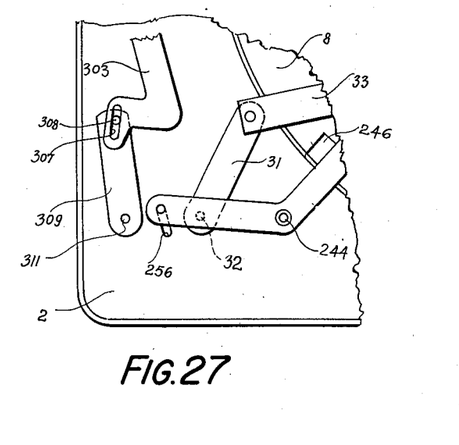
Fig. 27 is a bottom plan view of the speed and positioning controls showing them in a position different from that of Fig. 2.

The point of engagement of follower 297 with shoulder 301 determines the let-down of the pickup arm as described above. Since the pickup arm is adapted to be automatically carried into initial engagement with 12-inch, 10-inch and 7-inch records, it follows that mechanism must be provided to vary the position of engagement, with respect to the turntable and, therefore, to base plate 2, of follower 297 with shoulder 301 as the pickup arm is swung inwardly. The means by which this variation is accomplished comprises an intermediate lever 303 (Fig. 8) which is pivoted at 304 to the base plate 2. At one end, the lever 303 is bifurcated as at 306 for operative coupling with the pin 293 while its remaining end is apertured by a slot 307 through which extends a pin 308 carried by a control arm 309. The arm 309 is rigidly fixed to the lower end of a stub shaft 311 (Fig. 2) which is journalled in a vertical bushing 312, fixed to base plate 2, while at its upper end said shaft bears a handle 313, suitable means being also employed on the shaft to prevent displacement thereof from the bushing such as a C-washer 314 between said bushing and handle. It will now be apparent that by manually rotating the handle 313 (Fig. 1), the lever 309 may be turned from the position shown in Fig. 8 to that of Fig. 27. Lever 303 will then be moved, causing the movement of the lever 278 from its position in Fig. 20 to that shown in Fig. 19. Adjacent the handle 313, dial 35 is appropriately marked with suitable indicia, "7, 10 and 12" to one of which the handle is adapted to be turned when it is desired to select a let-down position for the pickup arm which is suitable for the size of record which it is desired that said pickup arm initially engage.

In the alternative embodiment disclosed in Figs. 22 to 25 inclusive, the let down position of the pickup arm and the speed of the turntable are adapted to be varied concurrently by cam means. In this connection, a base plate 316 rigidly supports a bushing 317 passing therethrough. A pintle 318 is journalled in the bushing and carries at its lower end, a cam 319. A control knob 321 is fixed to the upper end of the pintle as a means by which the cam is adapted to be rotated. Cam 319 is of irregular formation and is preferably struck from some suitable sheet metal. The cam is apertured, centrally thereof, by a hole 322 adapted to receive a section 323 of reduced diameter of the lower end of hub 318. Section 323 is further provided with opposed flat surfaces 324 for intimate association with complementary internal opposed flat surfaces 326 on the walls of the hole 322 to resist turning of the cam with respect to its pintle or hub 318. A special screw 327 holds the cam plate 319 to the pintle 318. This screw 327 is of unusual construction in that it includes a head 328 from opposite sides of which a threaded portion 329 and a stud portion 331 extend. The head 328 is adapted to receive a wrench, and the threaded portion 329 is, therefore, adapted to draw cam 319 tightly in place. The stud portion 331 extends through a slot 332 in a link 333 which is a counterpart of the link 33 of the previously described mechanism. Link 333 is supported by a plain washer 334 and thereunder, a C-washer 336 on the stud 331. Thus, the link 333 is adapted to slide freely over the stud 331 for conveying movement for varying the speed of the motive unit. In order that this may be effected, link 333 carries, on its upper surface, a stud or follower 337 which extends into a cam slot 338 in the cam 319. In the position indicated (Fig. 24), the follower 337 is engaged by a portion of the slot which provides for a turntable speed of approximately 78 R. P. M. As the cam 319 is rotated clockwise (Fig. 24), by the handle 321, a portion of cam slot 338, identified by the character 339, is carried over follower 337 drawing it closer to the axis of hub 318 so that the turntable is operated at a speed of 33⅓ R. P. M. In turning the came plate 319 counterclockwise from the Fig. 24 position another portion of cam slot identified by 341 is carried over the follower 337 thus moving the follower farther away from the axis of the dial hub 318 to change the turntable speed to 45 R. P. M. The upper side of the dial is appropriately marked by indicia "33, Std, and 45" indicating the speeds just referred to. These indicia, when turned to a stationary pointer or dot 342 on base plate 316, indicate the speed at which the turntable will be driven.

As has already been indicated, the angular position at which the pickup arm is adapted initially to engage a record is varied concurrently with variations of the turntable speed. In this alternative embodiment, this is effected by a second cam slot 343, in the cam plate 319, in which is received a pin or follower 344 carried at one end of a lever 346 coresponding to the intermediate lever 303, previously described. As the cam 319 is rotated by the knob 321, as previously explained, the lever 346 is rocked about its fulcrum pin 347 on the base plate 316.

The means by which the mechanism for manually rejecting a record is coordinated with the let-down and speed regulatory mechanism comprises an annular member 348. For its association with knob 321, said knob is undercut at 349, the smaller diameter portion extending through member 348. A pair of handles or contactor arms 351 on member 348 extends beyond the periphery of the knob 321, the ends of the arms being preferably knurled for engagement by the fingers of an operator. From the lower side of member 348, a pin 352 extends downward through a slot 353 in the base plate 316. Pin 352 is adapted to engage a lever 354 pivoted at 356 to the base plate 316. Lever 354 is the counterpart of lever 243 and is biased by spring pressure, not shown, clockwise about pivot 356, and into engagement with the pin 352 which is thereby biased to one end of the slot 353. By rotating the annular member 348 against the force of the lever 354, thereby swinging said lever counterclockwise, a record changing cycle is initiated. After the arms 351 have been released, they are returned to their original position by lever 354.

Figure 22:
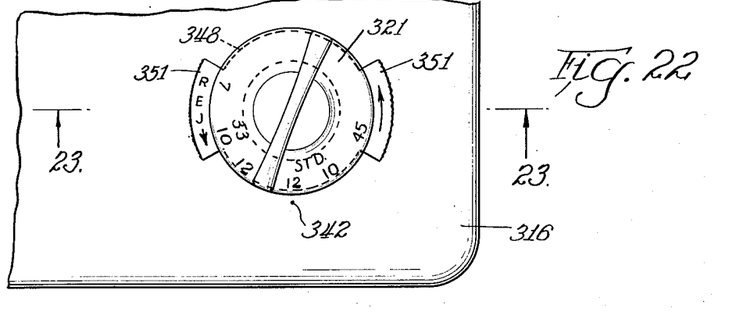
Fig. 22 is a portion of a second embodiment of the invention, the view corresponding to the elements shown in the lower right hand corner of Fig. 1.
Figures 23, 24, 25:
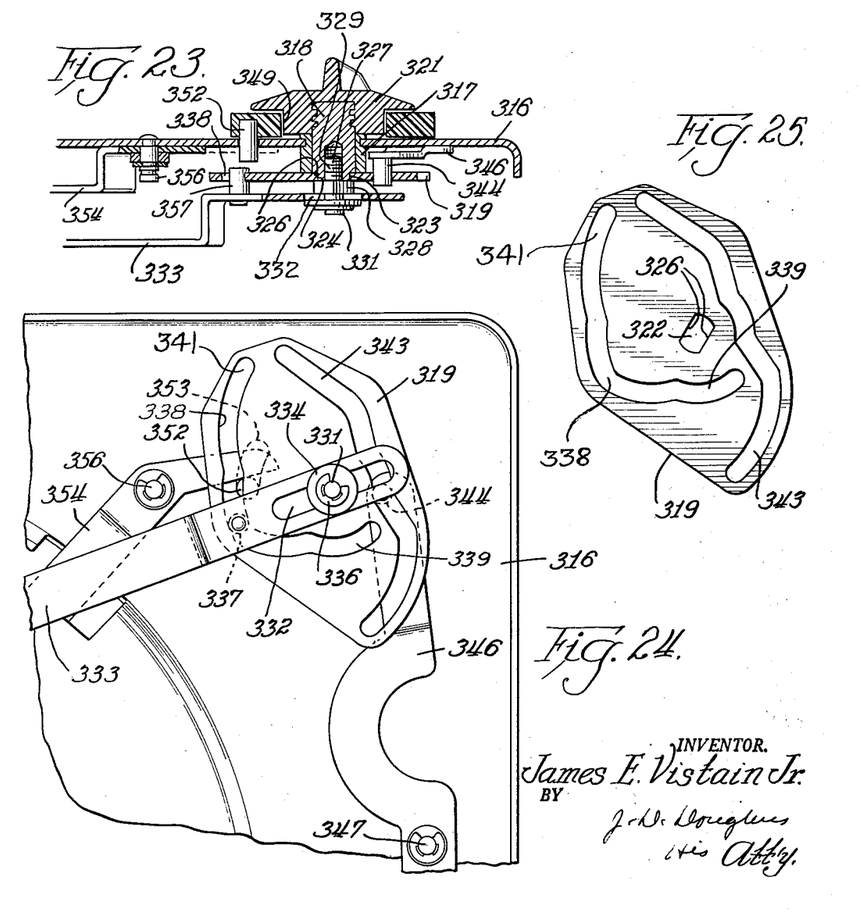
Fig. 23 is a vertical sectional view taken on line 23—23 of Fig. 22.
Fig. 24 is a fragmentary bottom plan view of the elements shown in Fig. 22.
Fig. 25 is a bottom plan view of the cam per se shown in Fig. 24.

If desired, the arms 351 may bear some suitable indicia, as depicted in Fig. 22, for identification of this control and to indicate the manner of its use.

While I have described my invention in an embodiment thereof, I am aware that numerous and extensive departures may be made therefrom without departing from the spirit or scope of my invention.

I claim:

1. In a record player of the class described having an ejector mechanism which includes a horizontal plate adapted to be swung about a vertical axis to selectively station either of two shelf portions on the plate in a predetermined position to provide peripheral support thereon for either large or medium sized records on one of the respective shelf portions and a push plate adapted to be swung about said vertical axis to dislodge a record from either of the shelf portions at the predetermined position, in combination, a movable support arm pivotally secured to the push plate on a vertical axis at a point remote from said first vertical axis, means including a resilient member coupled to the support arm to maintain said arm removably in an inoperative position to provide for support of either of the two sizes of records by the horizontal plate, said last named means being adapted to retain said arm in an operative position to provide peripheral support for a stack of small sized records, protruding means on the end of said movable support arm to engage the periphery of one of the small sized records when said push plate is swung to dislodge a record from the stack of small sized records, and automatic means by which the push plate is adapted to be swung.

2. In a record player of the class described having an ejector mechanism which includes a horizontal member adapted to be swung abount a vertical axis so that either one of a pair of shelf portions at different distances from the axis on the horizontal member is adapted to be carried to a predetermined position to provide support for a different sized record at the periphery thereor, in combination, an ejector arm in association with said horizontal member, said ejector arm being adapted to be swung about said axis to dislodge a record of either size from either of the shelf portions, a foldable arm, pivotally connected to said ejector arm on a vertical axis at a point remote from said axis, a rotatable element, means in connection with said foldable arm by which said rotatable element is adapted to be carried therewith as said foldable arm is swung between two predetermined positions, retention surfaces on said ejector arm, a resilient member coupled to said foldable arm to urge said rotatable element into engagement with either of said retention surfaces to releasably retain said foldable arm in either a first predetermined position wherein it is adapted to provide support for the edge of a stack of records of a third size or a second predetermined position wherein it is adapted to permit operative support for either of the first mentioned sizes of records, and a record mover surface on the end of said foldable arm adapted to engage the bottommost record of a stack supported by said arm to release the bottommost record from said foldable arm when said ejector arm is operated.

3. In an automatic record player having an ejector head for support of records at their peripheral edges above the level of a driven turntable to which the records are adapted to be successively released in response to operation of a cyclically operated rotary master cam, the ejector head including a sleeve for support of a carrier plate on which the records are adapted to rest and an ejector shaft in extension throughout the length of said sleeve for support of an ejector plate for removal of a record from the support of said carrier plate, the combination of, means including an index plate carried by said sleeve to retain said carrier plate releasably in one of a plurality of predetermined positions in each of which said plate is adapted to support a different sized record, a prong plate fixed to said ejector shaft, resilient means anchored to the prong plate and said index plate to bias said ejector plate to a predetermined position with respect to said carrier plate, all of the plates being thereby adapted to be manually rotated together, a pivoted member coupled to the master cam, a plurality of cam surfaces on the prong plate, a follower on said pivoted member, said follower being adapted to engage one of the cam surfaces on said prong plate in response to cyclic operation of said master cam to swing said ejector plate with respect to said carrier plate thereby releasing a record from support of said carrier plate to said turntable.

4. In an automatic record player having an ejector head for support of records at their peripheral edges above the level of a driven turntable to which the records are adapted to be successivly released in response to operation of a cyclically operated rotary master cam, the ejector head including a sleeve for support of a carrier plate on which the records are adapted to rest and an ejector shaft extending through said sleeve for support of an ejector plate arranged to remove a record from the support of said carrier plate, the combination of means including an index plate carried by said sleeve to releasably retain said carrier plate in one of a plurality of predetermined positions in each of which said carrier plate is adapted to support different sized records, a record ejector operating plate fixed to said ejector shaft, resilient means connected between the ejector operating plate and said index plate to bias said ejector operating plate to a predetermined position with respect to said carrier plate, all of the plates being thereby adapted to be manually rotated together, a pivoted lever connected to the master cam, a plurality of arms defining cam surfaces on the record ejector operating plate, a follower on said pivoted lever, said follower being arranged to selectively engage one of the cam surfaces on said record ejector operating plate at a time in response to cyclic operation of said master cam to swing said ejector plate with respect to said carrier plate thereby releasing a record from support of said carrier plate to said turntable and means for engaging said index plate to hold it against movement.

5. In an automatic record player having an ejector head for support of records at their peripheral edges above the level of a driven turntable to which the records are adapted to be successively released in response to operation of a cyclically operated rotary master cam, the ejector head including a sleeve for support of a carrier plate on which the records are adapted to rest and an ejector shaft extending through said sleeve for support of an ejector plate arranged to remove a record from the support of said carrier plate, the combination of means including an index plate carried by said sleeve to releasably retain said carrier plate in one of a plurality of predetermined positions in each of which said carrier plate is adapted to support different sized records, a record ejector operating plate fixed to said ejector shaft, resilient means connected between the ejector operating plate and said index plate to bias said ejector operating plate to a predetermined position with respect to said carrier plate, all of the plates being thereby adapted to be manually rotated together, a pivoted lever connected to the master cam, a plurality of arms defining cam surfaces on the record ejector operating plate, a follower on said pivoted lever, said follower being arranged to selectively engage one of the cam surfaces on said record ejector operating plate at a time in response to cyclic operation of said master cam to swing said ejector plate with respect to said carrier plate thereby releasing a record from support of said carrier plate to said turntable, and means for engaging said index plate to hold it against movement, comprising a spring activated detent member arranged to engage the index plate and resilient means holding said member in engagement with the index plate.

References Cited in the file of this patent

UNITED STATES PATENTS

| 2,263,643 | Offen | Nov. 25, 1941 |
|---|---|---|
| 2,279,851 | Waln et al. | Apr. 14, 1942 |
| 2,328,641 | Glaser | Sept. 7, 1943 |
| 2,357,520 | Kahl | Sept. 5, 1944 |
| 2,396,094 | Gay | Mar. 5, 1946 |
| 2,488,260 | Ascoli | Nov. 15, 1949 |
| 2,506,555 | Wennerbo | May 2, 1950 |
| 2,517,165 | Ascoli | Aug. 1, 1950 |
| 2,527,646 | Mullaney | Oct. 31, 1950 |
| 2,549,246 | Schweitzer | Apr. 17, 1951 |
| 2,561,792 | Emde | July 24, 1951 |
| 2,594,563 | Johnson | Apr. 29, 1952 |
| 2,613,081 | Fisher | Oct. 7, 1952 |

FOREIGN PATENTS

| 606,458 | Great Britain | Aug. 13, 1948 |
|---|---|---|